No. 678,641. Patented July 16, 1901.
G. A. CARLETON, Jr.
FEED BAG.
(Application filed May 11, 1901.)

(No Model.)

WITNESSES:
Geo. W. Naylor
J. B. Owens

INVENTOR
George A. Carleton, Jr.
BY
ATTORNEYS

UNITED STATES PATENT OFFICE.

GEORGE A. CARLETON, JR., OF EDGEWATER, NEW JERSEY.

FEED-BAG.

SPECIFICATION forming part of Letters Patent No. 678,641, dated July 16, 1901.

Application filed May 11, 1901. Serial No. 59,817. (No model.)

*To all whom it may concern:*

Be it known that I, GEORGE A. CARLETON, Jr., a citizen of the United States, and a resident of Edgewater, in the county of Bergen and State of New Jersey, have invented a new and Improved Feed-Bag, of which the following is a full, clear, and exact description.

This invention relates to a feed-bag intended to avoid the great loss of feed occurring in connection with the use of bags of ordinary construction; and it involves a peculiarly-arranged false bottom which is fed steadily upward toward the animal's mouth, so as to keep the feed easily in reach of the animal and avoid the necessity of the animal throwing the bag upward to reach the feed, which movement is the cause of the loss above mentioned.

This specification is a specific description of one form of the invention, while the claim is a definition of the actual scope thereof.

Reference is to be had to the accompanying drawings, forming a part of this specification, in which similar characters of reference indicate corresponding parts in both the views.

Figure 1:
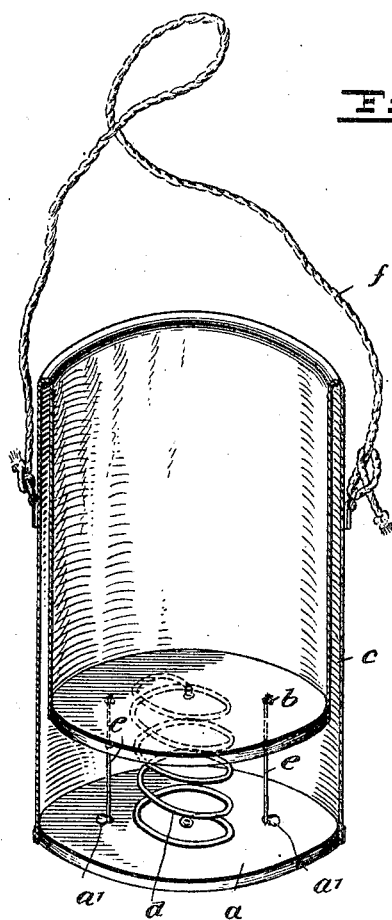
Figure 2:
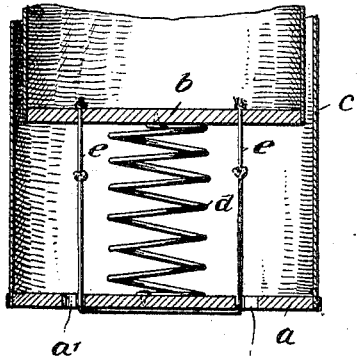

Figure 1 is a sectional perspective view of the invention, and Fig. 2 is a detail section showing the lower part of the bag.

$a$ represents the main or permanent bottom of the bag, and $b$ the false bottom, which is arranged above the main bottom $a$.

$c$ represents the material forming the body of the bag. This material is flexible and is preferably formed of some fabric in the shape of a tube, one end of which is fastened to the bottom $a$ and the other end of which is turned inward within the other portion of the tube and joined to the false bottom $b$, which false bottom therefore lies inside of the bag and is movable up and down, carrying with it the inner part of the tube forming the body of the bag.

$d$ indicates an expansive spring which is arranged between the bottoms $a$ and $b$ and which presses upward the bottom $b$.

$e$ indicates a cord which is fastened at its ends securely to the under side of the bottom $b$ and provided with knots or other enlargements thereon. This cord passes through keyhole-slots $a'$ in the bottom $a$, and by engaging the knots of the cord with the contracted portions of the slots the cords will be fastened to the bottom $a$. By these means the bottom $b$ may be held drawn downward in close proximity to the bottom $a$ and contrary to the pressure of the spring $d$. The middle portion of the cord $e$ passes under the bottom $a$, and thus limits the upward movement of the bottom $b$.

$f$ indicates the usual cord or other means for fastening the bag to the animal's head, which cord is attached to the outer part of the tube $c$.

In using the invention the bag is filled with feed and applied to the head of the animal in the usual manner, the bottom $b$ having previously been drawn down and held by the cord $e$. The cord is then released and the spring $d$ presses the bottom $b$ upward, holding the feed close against the mouth of the animal and enabling the animal to eat easily all of the feed within the bag. The arrangement of the bottom $b$ with respect to the flexible tube $c$ enables me to provide the bag with a movable bottom and at the same time to avoid clogging this bottom by the feed passing under or at the sides thereof.

Having thus described my invention, I claim as new and desire to secure by Letters Patent—

A feed-bag, having a main bottom, a false bottom, a body portion formed of a flexible tube one end of which is turned inward within the other part of the tube and attached to the false bottom and the other end of the tube carrying the main bottom, and means acting between the two bottoms to raise the false bottom, for the purpose specified.

In testimony whereof I have signed my name to this specification in the presence of two subscribing witnesses.

GEO. A. CARLETON, JR.

Witnesses:
I. B. OWENS,
JNO. M. RITTER.